(12) United States Patent
Chang (10) Patent No.: US 6,247,393 B1
(45) Date of Patent: Jun. 19, 2001

(54) MEANS FOR MAKING SOYBEAN MILK

(76) Inventor: Kwei Tang Chang, No. 14, Lane 54, Luong Chuan St., Panchiao City, Taipei Hsien (TW)

( * ) Notice: Subject to any disclaimer, the term of this patent is extended or adjusted under 35 U.S.C. 154(b) by 0 days.

(21) Appl. No.: 09/523,690

(22) Filed: Mar. 13, 2000

(51) Int. Cl.$^7$ ................................. A23C 3/02; A23L 1/20; A47J 43/044; B01F 7/20

(52) U.S. Cl. ................................. 99/348; 99/281; 99/285; 99/286; 99/288; 99/452; 99/453; 99/456; 99/483; 99/510; 99/513; 366/146; 366/249; 366/251

(58) Field of Search ............................... 99/275, 279–281, 99/283, 285, 286, 288, 290, 300, 323.3, 331, 341, 348, 452, 453, 456–460, 468, 483, 485, 495, 509–513; 426/43–46, 50, 52, 61, 656, 431, 520, 598; 210/346, 511, 514, 694, 780, 793; 366/279, 144–146, 249–251

(56) References Cited

U.S. PATENT DOCUMENTS 5,852,965 * 12/1998 Kim ................................. 99/348 X

* cited by examiner

Primary Examiner—Timothy F. Simone
(74) Attorney, Agent, or Firm—Rosenberg, Klein & Lee (57) ABSTRACT

The present invention proposes an apparatus for making soybean milk, wherein a cover body is connected to the opening of a container, and a fixing tank is extended form the cover body toward the inside of the container. A motor is installed in the fixing tank. A reaming blade is extended from the motor. A through passage is installed downwards from a position away from the center of the cover through the fixing tank to a cup-shaped component. A fixedly-joining device is installed at the inner edge of the opening of the cup-shaped component to be correspondingly joined with a fixedly-joined device installed at the bottom end of the peripheral surface of the fixing tank. The reaming blade is placed in the cup-shaped component. The periphery of the cup-shaped component is formed to be a filtering net. An electro-thermal tube is connected from the bottom edge of the cover into the container. When soybeans are guided in via the through passage, a small sealing cap is used to cover on the opening of the through passage. After the apparatus is turned on, the soybeans are reamed by the reaming blade, and soybean juice flows into the container while soybean lees is left in the cup-shaped component. After water is added and boiled, the cover is removed and a sealing cap is covered on the container. The sealing cap has a filtering net at a position corresponding to that of the conduct mouth of the container such that soybean can be filtered and poured out.

6 Claims, 9 Drawing Sheets

MEANS FOR MAKING SOYBEAN MILK

FIELD OF THE INVENTION

The present invention relates to a means for making soybean milk and, more particularly, to a means capable of making hot soybean milk after soybeans are directly put into it.

BACKGROUND OF THE INVENTION

People generally go to a soybean-milk store to buy soybean milk when they want to drink it. However, some soybean-milk stores sell relatively sloppy soybean milk. To drink mellow soybean milk, people have to make it themselves. It usually takes several hours from sousing, grinding, to cooking soybeans. Moreover, many apparatuses, including the juicer, the mill, the filtering device, and the pot, are used such that it takes much time to clean up these apparatuses. Much time and labor are wasted for making some or even a cup of soybean milk.

To meet practical requirements, a bean reamer has been designed. Soybeans are put into its container with a filtering net, and then the container is locked at a position near its reamer blade. The assembly and disassembly of the container is inconvenient. The disassembly and assembly of the blade and motor are also needed because they are separate, resulting in further inconvenient use. Soybeans can not be added during operations. Moreover, because its heating device is installed near the bottom surface, uniform heating thus can not be easily achieved and the required heating time is long.

SUMMARY AND OBJECTS OF THE PRESENT INVENTION

The primary object of the present invention is to provide a means for making soybean milk such that the required procedures for making soybean milk can be integrated into this means. Moreover, safe and sanitary use can be achieved. Because the container is transparent, the operations can be clearly seen. Soybeans are put in turn into a through passage such that they can be reamed more uniformly. A reaming blade is fixed on a cover body so as to increase the sealing degree of a fixing tank for fixing a motor. Moreover, an electro-thermal tube is extended out from the cover body to form a straight part and a ring part. The ring part is situated near the bottom surface of a cup-shaped component such that heating can be more uniformly and quickly. The fixing, joining, and disassembly of the cup-shaped component is easy. A sealing cap is further installed for replacing the cover body and filtering heated soybean milk such that clean and sanitary soybean milk can be obtained.

The present invention proposes a means for making soybean milk, wherein a cover body is connected to the opening of a container and a fixing tank is extended from the cover body toward the inside of the container. A motor is installed in the fixing tank. A reaming blade is extended from the motor. A through passage is installed downwards from a position away from the center of the cover body through the fixing tank to a cup-shaped component. A fixedly-joining device is installed at the inner edge of the opening of the cup-shaped component to be correspondingly joined with a fixedly-joined device installed at the bottom end of the peripheral surface of the fixing tank. The reaming blade is placed in the cup-shaped component. The periphery of the cup-shaped component is formed to be a filtering net. An electro-thermal tube is connected from the bottom edge of the cover body into the container. When soybeans are guided in via the through passage, a small sealing cap is used to cover the opening of the through passage. After the means is turned on, the soybeans are reamed by the reaming blade and the soybean juice flows into the container while the soybean lees is left in the cup-shaped component. After water is added and boiled, the cover body is removed and a sealing cap is used to cover the container. The sealing cap has a filtering net at a position corresponding to that of the conduct mouth of the container such that soybean can be filtered and then poured out.

The various objects and advantages of the present invention will be more readily understood from the following detailed description when read in conjunction with the appended drawings, in which:

DETAILED DESCRIPTION OF PREFERRED EMBODIMENT

As shown in FIGS. 1 to 11, the present invention proposes a means for making soybean milk, wherein a cover body 2 is joined with the opening of a container 1. The container 1 has a conduct mouth 11 and a handgrip 12. To fix the handgrip 12 and protect the transparent container 1, a ring 14 and a bottom seat 13 are installed. As shown in FIGS. 4 to 7, a ring seat 10 is installed on the container 1 to mount the ring 14 such that the two ends of the ring 14 is fixedly locked at the two sides of a pinch plate 15. A screw 16 penetrates a through hole of the pinch plate 15 and an upper groove hole 17 of the handgrip 12 and is screwed with a nut 18 so as to fix the upper end of the handgrip 12. A screw 8 penetrates a lower groove hole 19 of the handgrip 12 and is screwed at a screw hole 9 of the bottom seat 13. The bottom seat 13 is made of hard material and has a U-shaped cross section to mount the bottom end of the container 1.

A fixing tank is extended from the bottom surface of the cover body 2 toward the inside of the container 1. The fixing tank 22 and the bottom edge 21 of the cover body 2 are integrally formed. The fixing tank 22 is joined with the cover body 2. A motor 23 is installed in the fixing tank 22. The axis of the motor 23 penetrates the bottom surface 24 of the fixing tank 22 and extends downwards to a reaming blade 25. The pivot of the motor and the pivot of the reaming blade can be of the same axis and are fixedly connected via a fixing element. The fixing element can be a fixing block 28 through the pivot and be locked with the bottom surface of the fixing tank 22 via screws 29. The reaming blade is S-shaped and has blade teeth. The reaming blade is locked at the bottom end of the pivot via a screw 27. A lift grip 48 is installed on the cover body 2. A power socket 49 is installed at one side of the lift grip 48 and an electric wire is connected to the power socket.

A through passage 20 is installed downwards from a position away from the center of the cover body 2 through the fixing tank 22 to a cup-shaped component 3. A recess situated at the top surface is used to match with the through passage 20. The inner edge of the opening of the cup-shaped component 3 has a fixedly-joining device 31 to be correspondingly joined with a fixedly-joined device 26 installed at the bottom end of the peripheral surface of the fixing tank 22. The fixedly-joining device shown in figures is a plurality of projecting points, and the fixedly-joined device is a plurality of slanting protrusions. Once turned along a favorable direction, the cup-shaped component 3 can be detached from the fixing tank 22. If turned contrariwise, the cup-shaped component 3 can be fixed below the fixing tank 22. The outer diameter of the lower section of the fixing tank 22 is about the same as that of the cup-shaped component 3. When the cup-shaped component is joined, the reaming blade 25 is placed in the cup-shaped component 3 and the periphery of the cup-shaped component 3 forms a filtering net 32. The filtering net 32 are formed by punch press.

Figure 10:
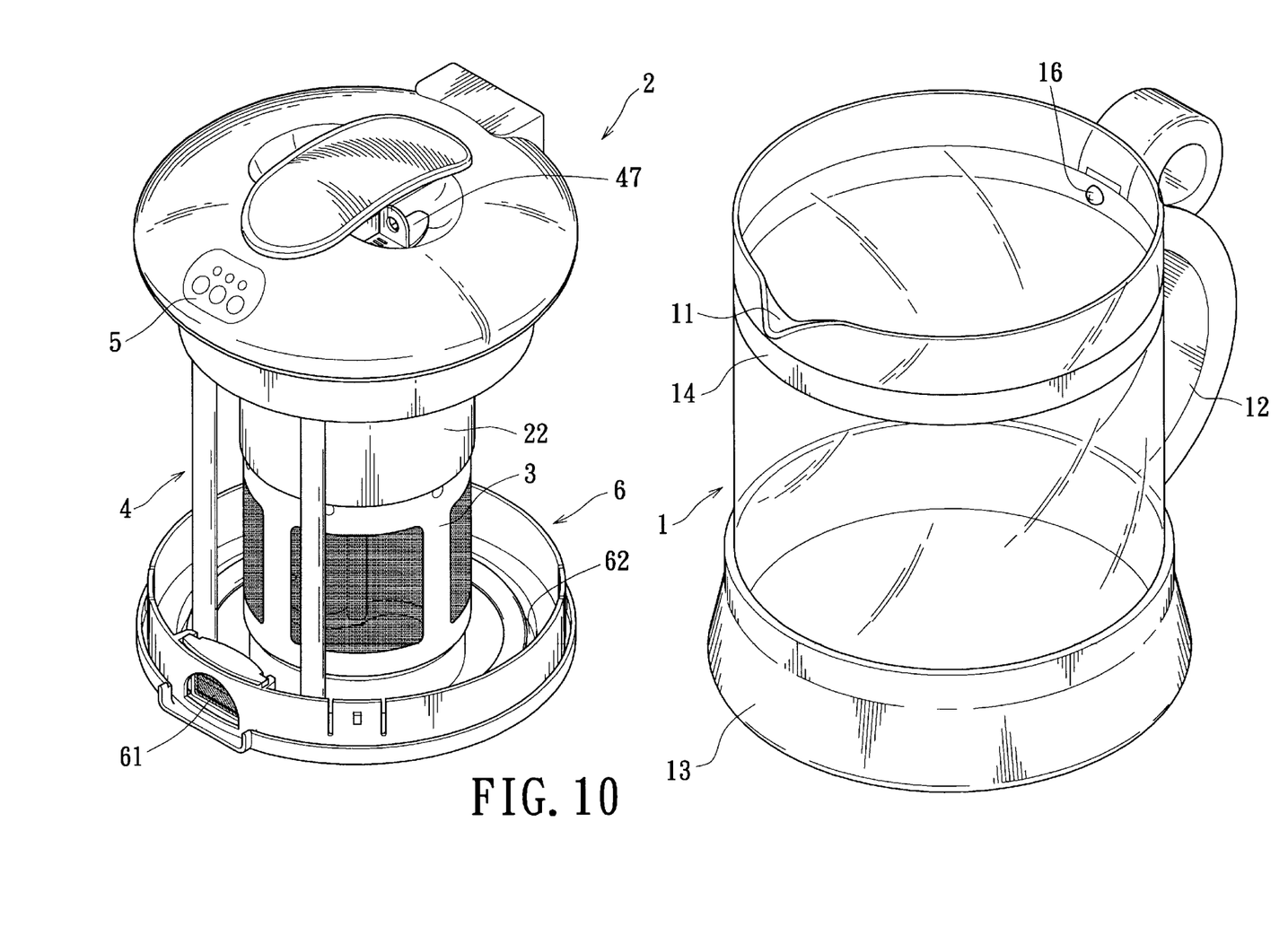
FIG. 10 is a perspective view of the present invention when the cover body is placed on the sealing cap.
Figure 11:
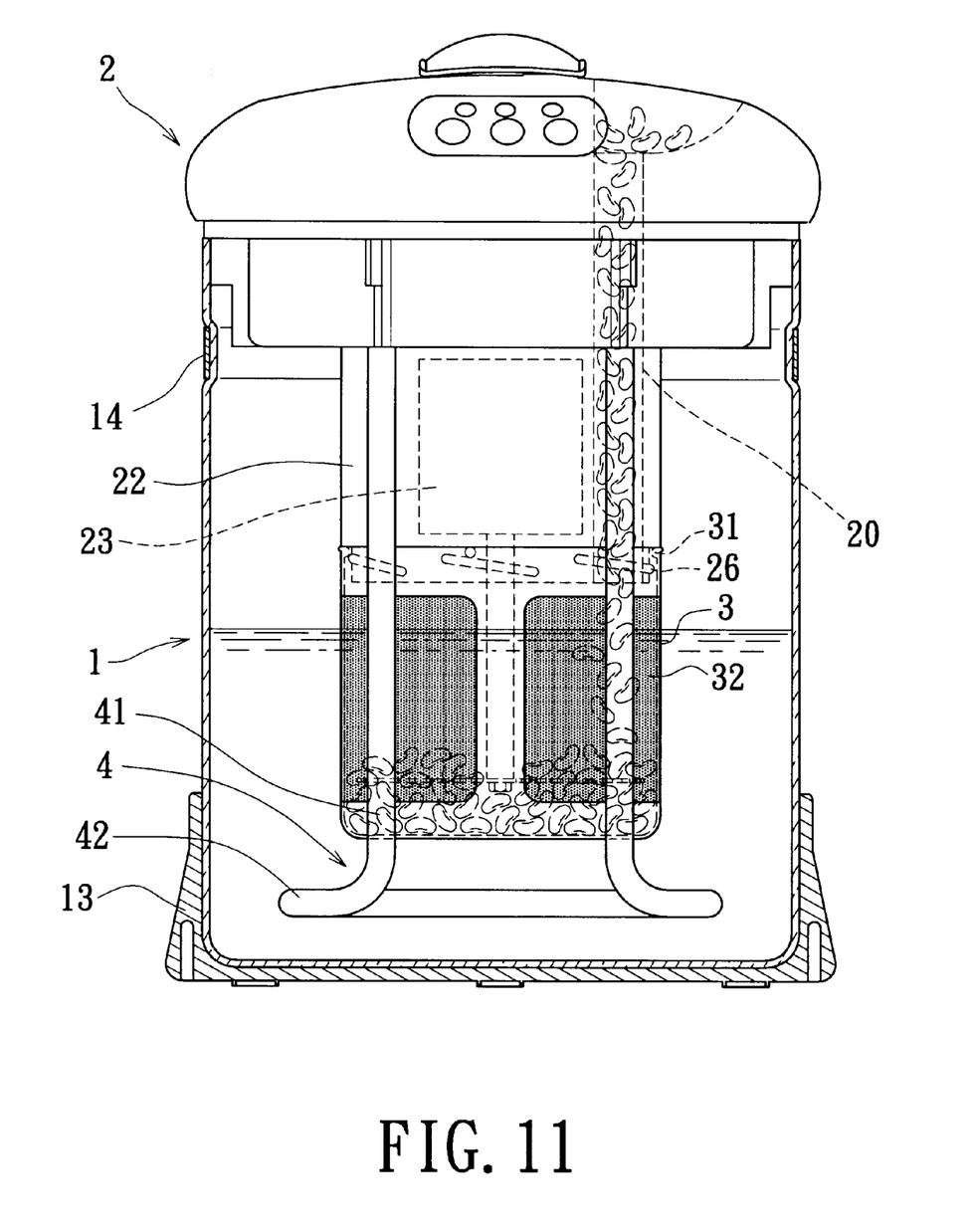
FIG. 11 is a front cross-sectional view of the present invention.

An electro-thermal tube 4 is connected from the bottom edge 21 of the cover body 2 into the container 1. The electro-thermal tube 4 is extended out from the cover body 2 to form a straight part 41 and a ring part 42. The ring part 42 is situated near the bottom surface of the cup-shaped component 3. After soybeans are guided in from the top end of the through passage 20, a sealing cap 47 is used to cover the mouth of the through passage 20. When the means is turned on to let the motor rotate, the soybeans are reamed such that soybean juice flows into the container 1 through the filtering net of the cup-shaped component 3 and soybean lees is left in the cup-shaped component 3. After enough soybeans have been reamed, water is added in via the through passage 20. A switch 5 is activated to boil the water via the electro-thermal tube 4. The cover body 2 is then removed and a sealing cap 6 is used to cover on the container. A filtering net 61 is installed on the sealing cap 6 at a position corresponding to that of the conduct mouth 11 of the container 1. The filtering net 61 is finer than the filtering net of the cup-shaped component 3 so as to filter out small soybean lees flowing into the container 1. Mellow soybean milk can be poured out via the conduct passage 11 with the handgrip 12 of the container 1 held. The procedures are shown in FIGS. 10 and 11.

Figure 1:
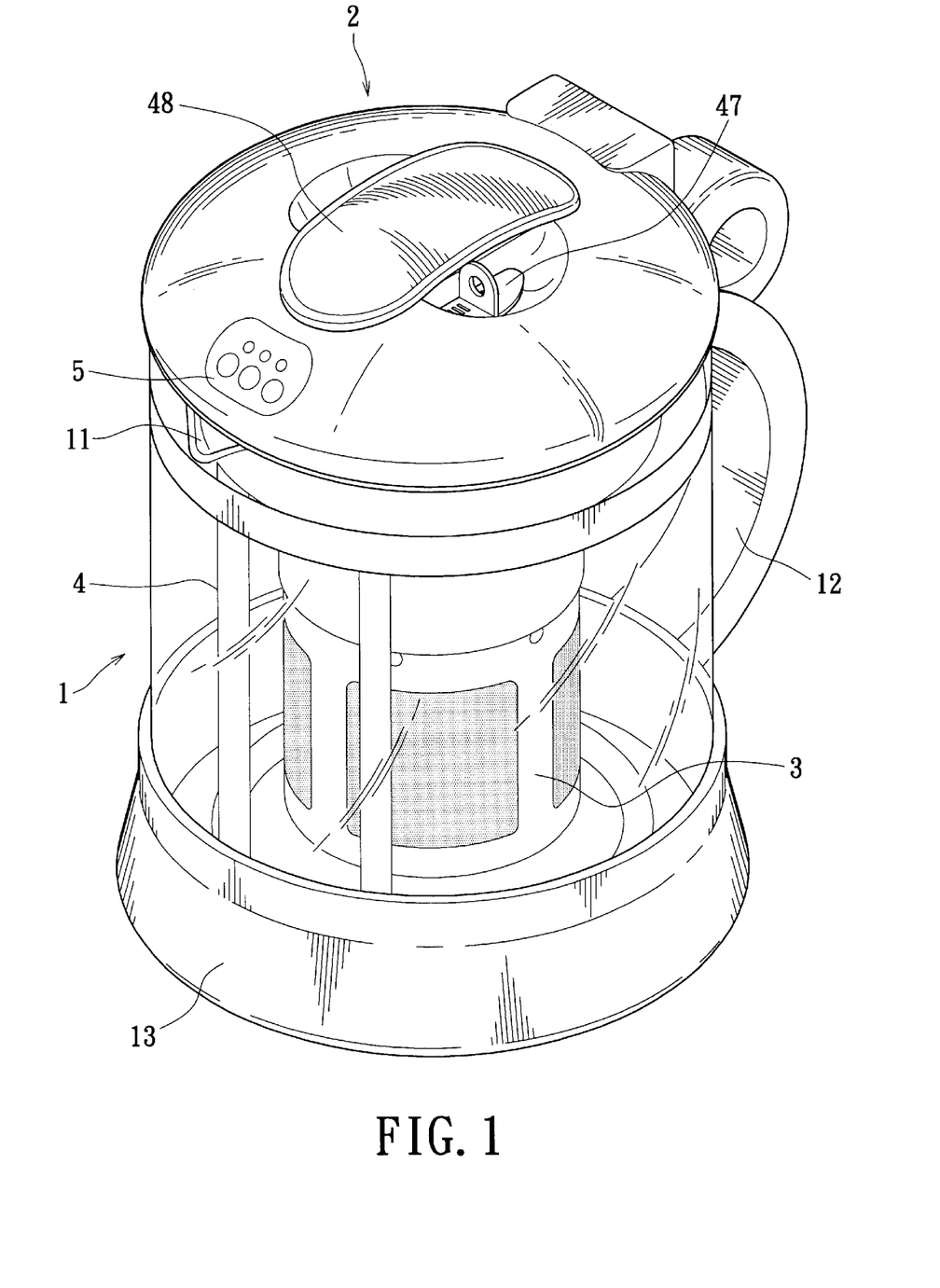
FIG. 1 is a perspective view of the present invention.
Figure 2:
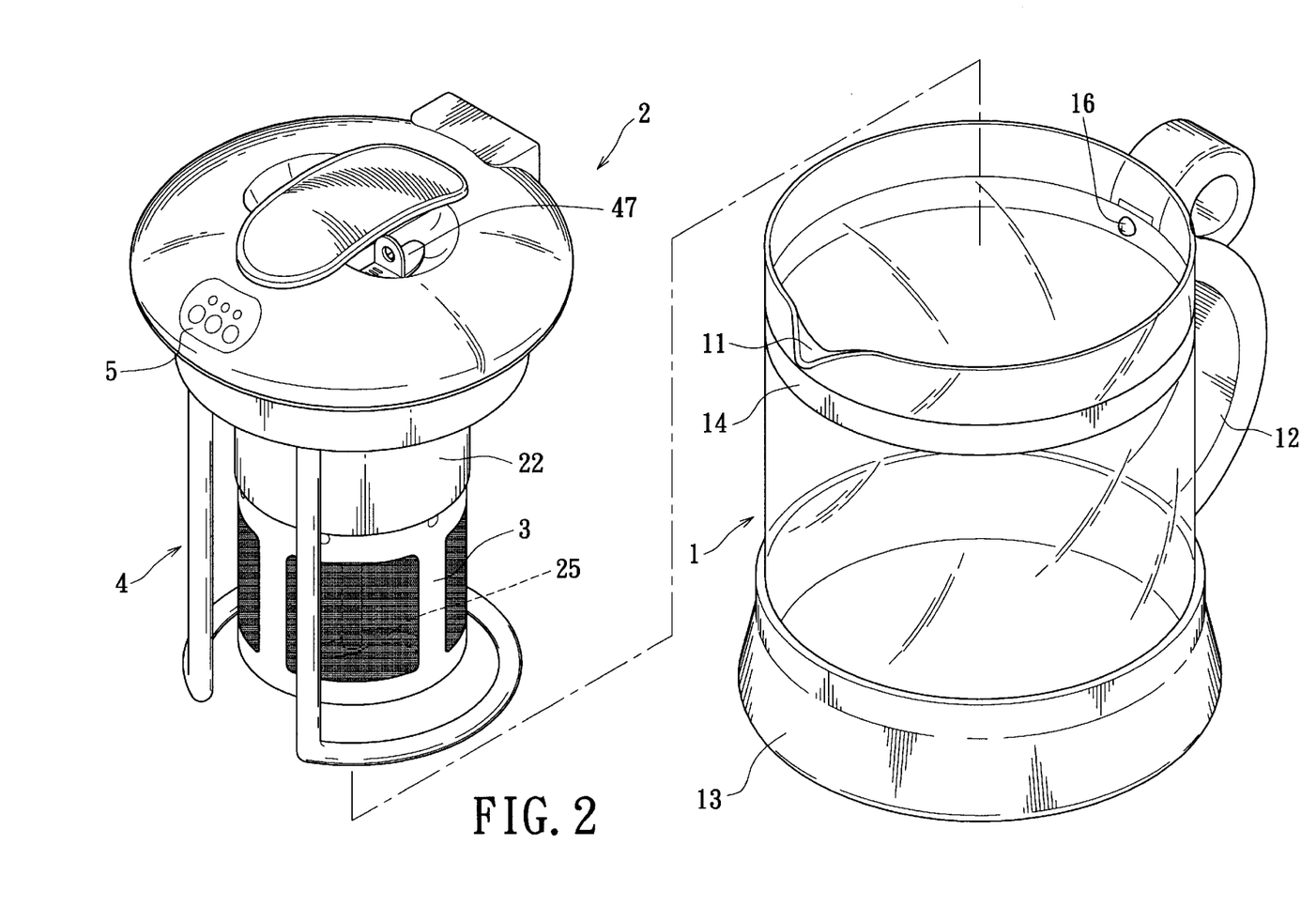
FIG. 2 is a perspective view of the present invention when only the cover body is separated.
Figure 3:
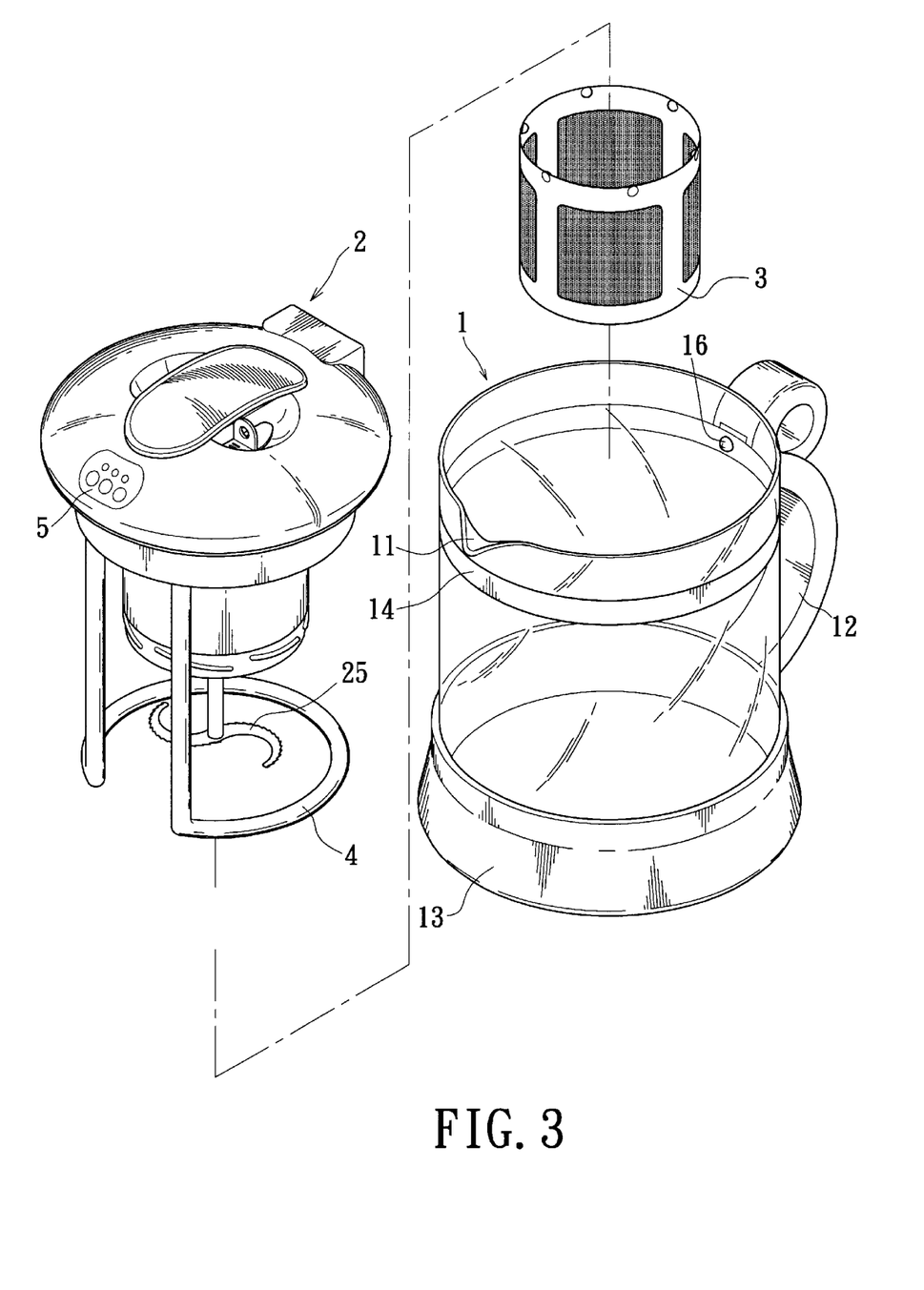
FIG. 3 is a perspective view of the present invention when only the cover body and the cup-shaped component are separated.
Figure 4:
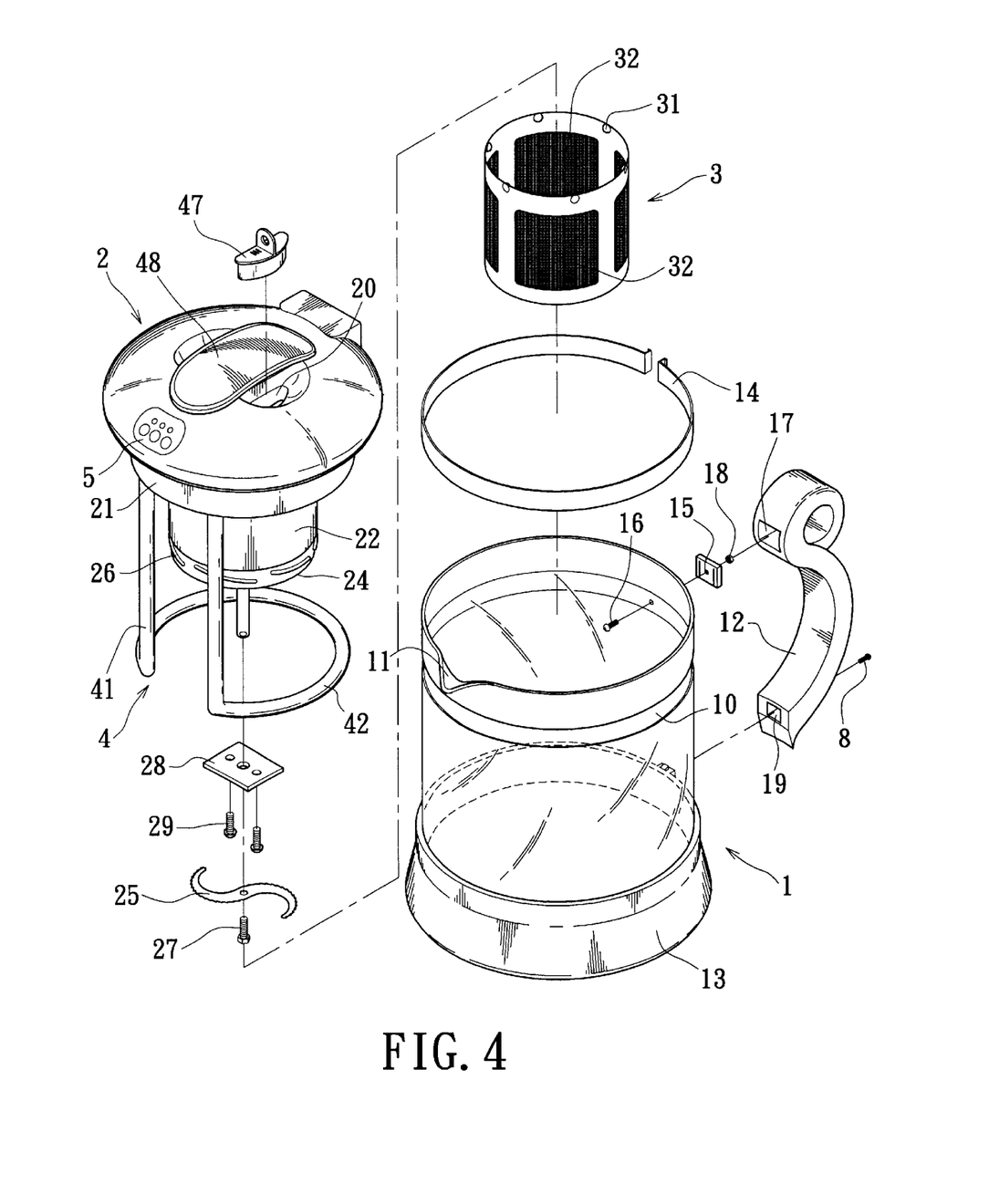
FIG. 4 is an exploded perspective view of the present invention.
Figure 5:
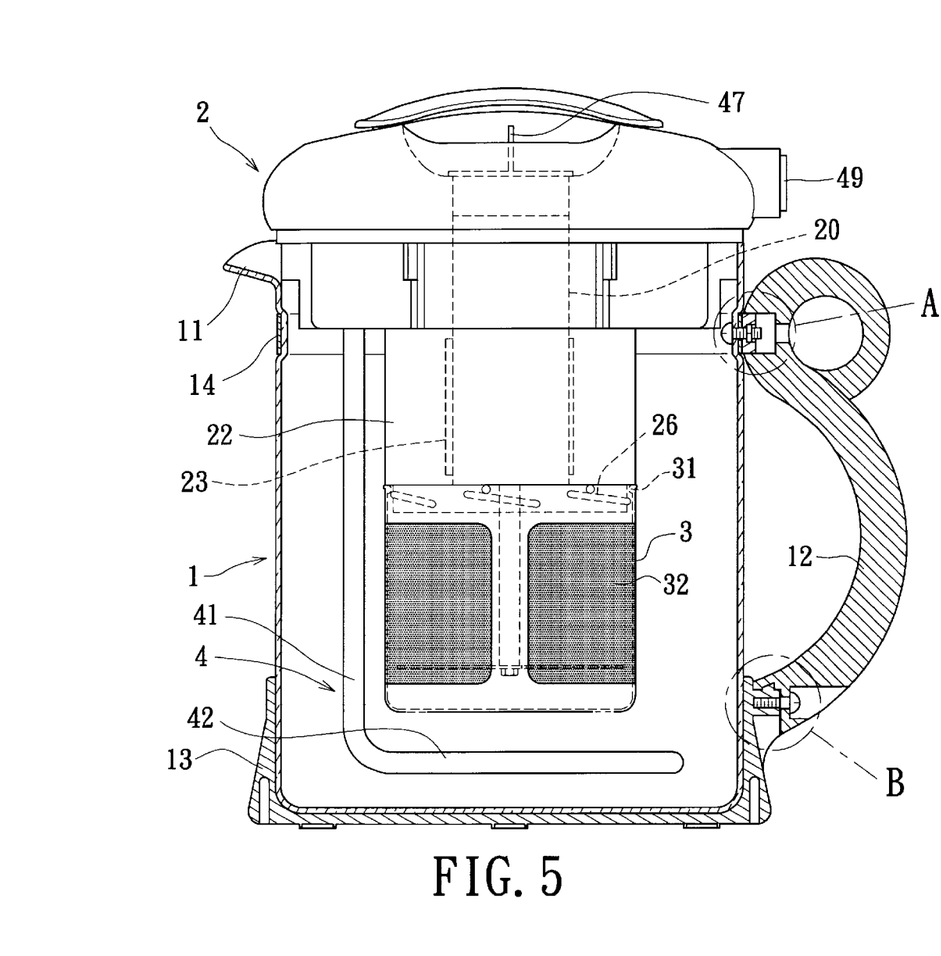
FIG. 5 is a side cross-sectional view of the present invention.
Figure 6:
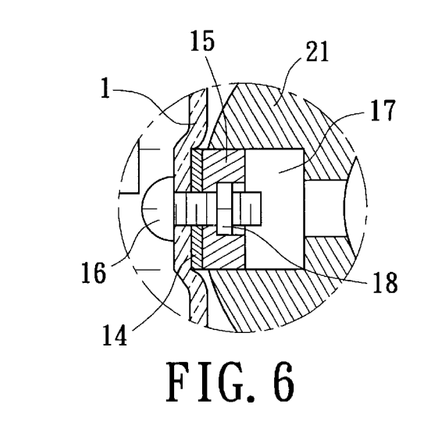
FIG. 6 is an enlarged view of part A shown in FIG. 5.
Figure 7:
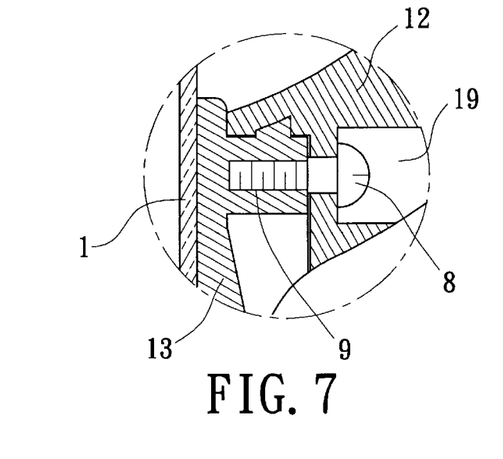
FIG. 7 is an enlarged view of part B shown in FIG. 5.
Figure 8:
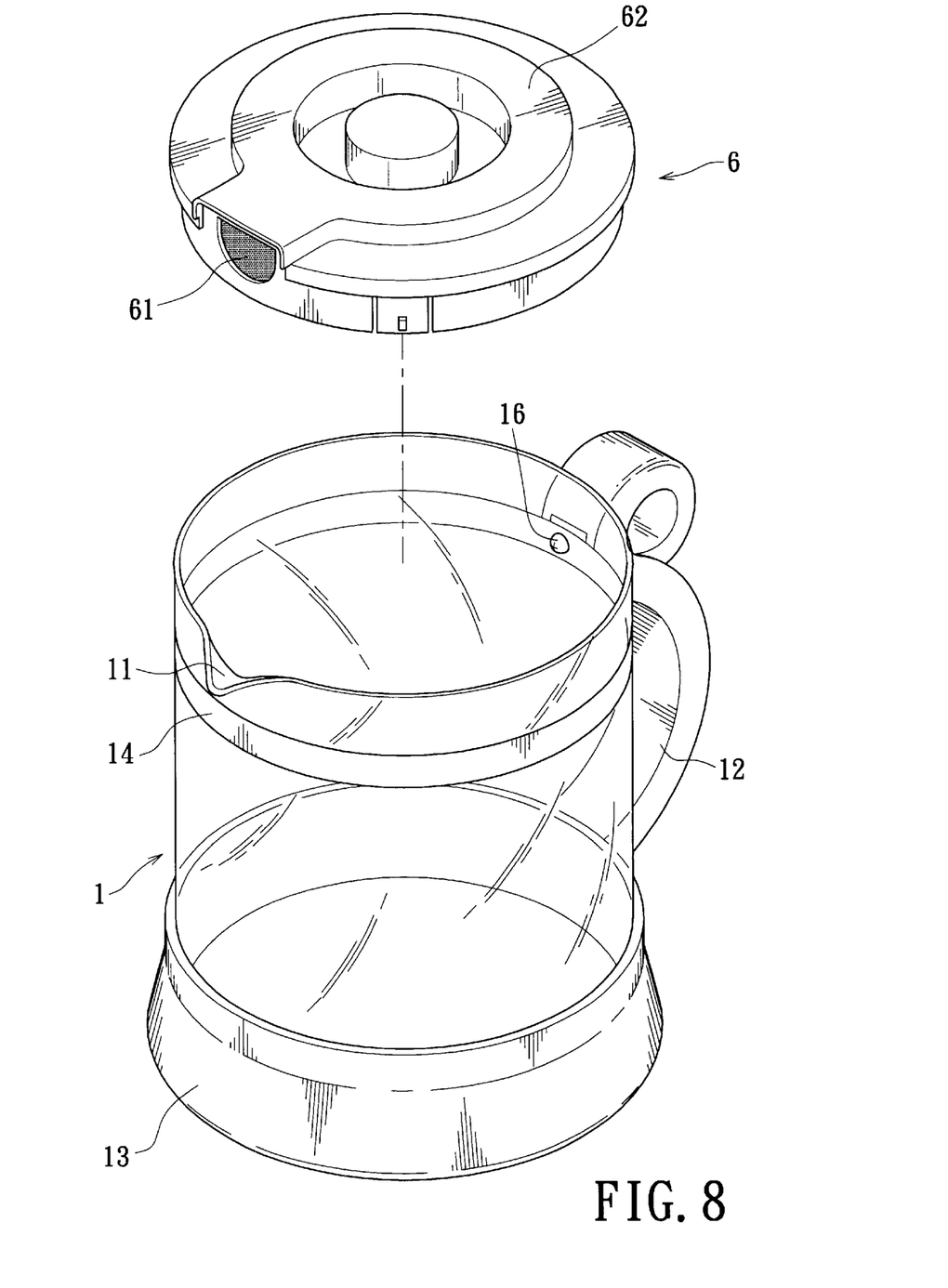
FIG. 8 is an exploded perspective view of the present invention when the cover body is replaced with a sealing cap.
Figure 9:
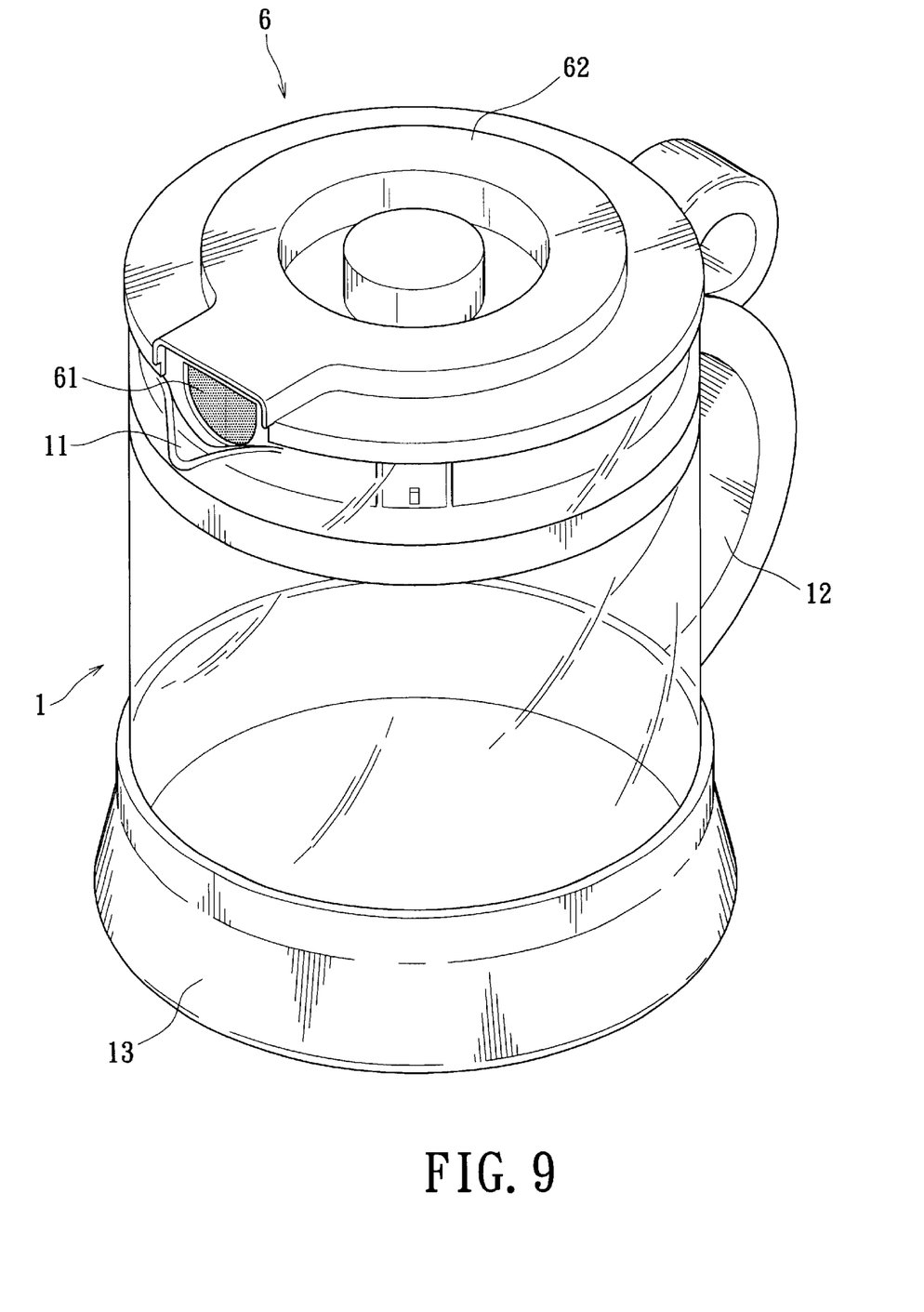
FIG. 9 is a perspective view of the present invention when the cover body is replaced with a sealing cap.

As shown in FIGS. 8 and 9, an annular accommodation trough 62 is installed in the sealing cap 6. When the cover body 2 is removed, the middle section of the electro-thermal tube 4 can be bent to form a ring part 42 to mount at the accommodation trough 62 of the sealing cap 6 for cleaning the container and reducing the rubbing of the electro-thermal tube.

To sum up, the present invention uses a cover body and a sealing cap integrally installed to match a container. The structure is simple and the assembly and disassembly is easy. All dynamic and heating devices are installed on the cover body to increase the convenience of fabrication and use. Because no electric wire and heater are needed, the weight of the container can be reduced, resulting in easier holding and lifting. When the sealing cap is used, residual soybean lees can not flow out because of second filtering. Soybean milk of higher quality can thus be obtained. Moreover, the cleaning is very easy and safe and sanitary design provides very good performance.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A soybean milk forming apparatus comprising:
   (a) a container having an upper edge portion defining an opening, said upper edge portion having formed thereon a laterally protruding conduct mouth, said container including a handgrip portion;
   (b) a cover body removably coupled to said container to substantially cover said opening thereof, said cover body including:
      (1) a fixing tank portion extending from an upper portion into said container, said fixing tank portion housing a motor, a through passage extending through said upper and fixing tank portions for guiding the introduction of soybean;
      (2) a reamer blade coupled to said motor;
      (3) a sealing cap releasably engaging said upper portion for selectively blocking said through passage;
      (4) a switch coupled to at least one of said upper and fixing tank portions; and,
      (5) a power socket disposed an at least one of said upper and fixing tank portions;
   (c) a cup-shaped component having an edge portion engaging said fixing tank portion of said cover body in releasably locked manner, said edge portion defining an opening disposed in communication with said cover body through passage, said cup-shaped component receiving said reamer blade for the reaming therein of soybean introduced through said cover body through passage, said cup-shaped component including a plurality of perforated filtering net peripheral portions for filtering a liquid byproduct of the reamed soybean; and,
   (d) an electro-thermal tube suspended from said cover body to extend into said container for heating the liquid byproduct collected in said container.

2. A soybean milk forming apparatus comprising:
   (a) a container having an upper edge portion defining an opening, said upper edge portion having formed thereon a laterally protruding conduct mouth, said container including a handgrip portion;
   (b) a cover body removably coupled to said container to substantially cover said opening thereof, said cover body including:
      (1) a fixing tank portion extending from an upper portion into said container, said fixing tank portion housing a motor, a through passage extending through said upper and fixing tank portions for guiding the introduction of soybean;
      (2) a reamer blade coupled to said motor;
      (3) a first sealing cap releasably engaging said upper portion for selectively blocking said through passage;

(4) a switch coupled to at least one of said upper and fixing tank portions; and, (5) a power socket disposed an at least one of said upper and fixing tank portions;

(c) a cup-shaped component having an edge portion engaging said fixing tank portion of said cover body in releasably locked manner, said edge portion defining an opening disposed in communication with said cover body through passage, said cup-shaped component receiving said reamer blade for the reaming therein of soybean introduced through said cover body through passage, said cup-shaped component including a plurality of perforated filtering net peripheral portions for filtering a liquid byproduct of the reamed soybean;

(d) an electro-thermal tube suspended from said cover body to extend into said container for heating the liquid byproduct collected in said container; and, (e) a second sealing cap for alternatively covering said opening of said container upon decoupling of said cover body from said container, said second sealing cap having a pouring conduit portion formed thereon to engage said conduct mouth of said container upper edge portion, said pouring conduit portion having a perforated filtering net extending thereacross.

3. The soybean milk forming apparatus as recited in claim 2 wherein said electro-thermal tube includes an annularly contoured ring shaped section.

4. The soybean milk forming apparatus as recited in claim 3 wherein said second sealing cap has formed therein an annular accommodation trough portion for receiving said ring shaped section of said cover body electro-thermal tube in conforming manner upon removal thereof from said container.

5. The soybean milk forming apparatus as recited in claim 2 further comprising a bottom seat having a substantially U-shaped sectional contour supporting said container, said handgrip having a lower end secured to said bottom seat.

6. The soybean milk forming apparatus as recited in claim 2 further comprising a ring member and a pinch plate coupled thereto, said ring member engaging a ring seat portion formed in said container to encircle said container and having a pair of ends secured to said pinch plate, said pinch plate being secured to an upper end of said handgrip.

* * * * *